United States Patent
Kosynkin et al.

(10) Patent No.: US 12,173,227 B2
(45) Date of Patent: Dec. 24, 2024

(54) MITIGATION OF FLUID LOSS FROM UNDERGROUND RESERVOIRS BY ELECTROSTATICALLY-DRIVEN ASSEMBLY OF PARTICLES

(71) Applicant: Quidnet Energy Inc., Houston, TX (US)

(72) Inventors: Dmitry Kosynkin, Houston, TX (US); Howard K. Schmidt, Hockley, TX (US)

(73) Assignee: Quidnet Energy Inc., Houston, TX (US)

( * ) Notice: Subject to any disclaimer, the term of this patent is extended or adjusted under 35 U.S.C. 154(b) by 332 days.

(21) Appl. No.: 17/677,734

(22) Filed: Feb. 22, 2022

(65) Prior Publication Data

US 2022/0267665 A1    Aug. 25, 2022

Related U.S. Application Data

(60) Provisional application No. 63/151,563, filed on Feb. 19, 2021.

(51) Int. Cl.
*C09K 8/512* (2006.01)

(52) U.S. Cl.
CPC .......... *C09K 8/512* (2013.01); *C09K 2208/18* (2013.01)

(58) Field of Classification Search
CPC ..... C09K 8/512; C09K 2208/18; C09K 8/508
See application file for complete search history.

(56) References Cited

U.S. PATENT DOCUMENTS

| | | | | |
|---|---|---|---|---|
| 4,532,052 A | * | 7/1985 | Weaver | C09K 8/508 507/923 |
| 7,857,054 B2 | | 12/2010 | Boney et al. | |
| 8,664,165 B2 | | 3/2014 | Horton et al. | |
| 9,410,069 B2 | * | 8/2016 | Zha | C09K 8/64 |
| 2007/0281870 A1 | | 12/2007 | Robb et al. | |

OTHER PUBLICATIONS

International Search Report and Written Opinion for Application No. PCT/US2022/017367 dated Jul. 29, 2022.
International Preliminary Report on Patentability for Application No. PCT/US2022/017367 dated Aug. 22, 2023.

* cited by examiner

*Primary Examiner* — Kumar R Bhushan
(74) *Attorney, Agent, or Firm* — Tumey L.L.P.

(57) ABSTRACT

Compositions are provided for preventing or alleviating loss of fluids from natural or artificial reservoirs formed in subterranean geological formations and methods for deployment of said compositions. The compositions can be delivered to the subterranean reservoirs in any number of steps and are comprised of rock surface adhesion promoter(s), particles that may consist of solids, gels and liquids, cross-linking agent(s) and a liquid medium. The method of the invention uses the composition of the invention in preventing or alleviating loss of fluid stored in a reservoir existing in a subterranean formation. In the method, the composition is preferably provided in a series of weighted or unweighted "pills" for introduction into the reservoir. Such a series may include from one to any number of consecutive treatments. Multiple pills or treatments may be used if needed.

2 Claims, No Drawings

MITIGATION OF FLUID LOSS FROM UNDERGROUND RESERVOIRS BY ELECTROSTATICALLY-DRIVEN ASSEMBLY OF PARTICLES

CROSS-REFERENCE TO RELATED APPLICATIONS

This application claims priority to U.S. Provisional Patent Application Ser. No. 63/151,563 filed Feb. 19, 2021, the entire contents of which are incorporated herein by reference thereto.

STATEMENT REGARDING FEDERALLY SPONSORED RESEARCH OR DEVELOPMENT

Not applicable.

BACKGROUND OF THE INVENTION

Field of the Invention

The present invention pertains to methods and compositions for preventing or alleviating the loss of stored water into a subterranean formation comprising a storage reservoir.

BACKGROUND OF THE INVENTION

Artificial or natural storage reservoirs created in subterranean formations often suffer from unacceptably high rates of the stored fluid loss due to leak off into said formations through both naturally occurring pores, fissures, fractures, vugs and larger voids as well as their artificially imparted equivalents. Additionally, excessive fluid pressure may cause undesirable reservoir expansion due to hydraulic fracturing of the formation. Multiple methods and materials have been utilized or proposed to ameliorate these phenomena. The action of these materials can be roughly divided into two modes that sometimes operate concurrently: mechanical blockage of the flow and fluid thickening that may ultimately proceed to formation of a new solid phase. The thickening compositions contain either inorganic or organic polymer particles reacting with water to form three-dimensional networks.

Most commonly used inorganic particles are composed of silicates and form the networks due to either relatively weak ionic interactions observed in clay slurries or much stronger covalent bonding seen in hydraulic cement mixtures upon hydration of calcium silicates. The organic polymer particles most often include partially hydrolyzed polyacryamide (PHPA) and form thick gels upon contact with water. The gels remain water-soluble unless a crosslinking agent is supplied. At sufficient concentration of the polymer and the crosslinking agent, the resulting gel may achieve mechanical strength of rubber while remaining elastic. The gel elasticity is particularly important in applications where the seal experiences cyclical stress changes.

BRIEF SUMMARY OF SOME OF THE PREFERRED EMBODIMENTS

Embodiments include compositions for preventing or alleviating loss of fluids from natural or artificial reservoirs formed in subterranean geological formations and methods for deployment of said compositions. The compositions can be delivered to the subterranean reservoirs in any number of steps and are comprised of rock surface adhesion promoter(s), particles that may include solids, gels and liquids, crosslinking agent(s) and a liquid medium.

The adhesion promoters are selected from a group including, but not limited to, polyethyleneimine (PEI), polydialdimethylammonium chloride (polyDADMAC), cationic polyacrylates, aliphatic polyamines, chitosan, cationic surfactant(s) and polyvalent metal cations. The particles may include water-swellable, but not water soluble polymers, such as crosslinked partially hydrolyzed polyacryalamide (PHPA), reduced graphene oxide (RGO), oxidized graphite, oxidized ground coke, ground lignite, ground rubber, asphaltenes, bitumen, synthetic or natural rubber, organic polymers not substantially swelling in water, ground cellulosic natural materials such as nut shells, clays, silica, mica and zeolites. The crosslinking agents may include cationic water-soluble polymers, exemplified by polyethyleneimine, polyDADMAC, cationic acrylates, polyamines, polyvalent metal cations, sulfur, soluble polysulfides, organic or inorganic peroxides and other oxidizers such as hypochlorites, chlorine, bromine, chlorine dioxide, manganese dioxide, manganates and permanganates.

Method use the compositions in preventing or alleviating loss of fluid stored in a reservoir existing in a subterranean formation. In the method, the composition may be provided in a series of weighted or unweighted "pills" for introduction into the reservoir. Such a series may include from one to any number of consecutive treatments. Multiple pills or treatments may be used if desired.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE PREFERRED EMBODIMENTS

It is to be understood that the following disclosure provides many different embodiments, or examples, of the present invention for implementing different features of various embodiments of the present invention. Specific examples of components are described below to simplify and exemplify the present disclosure. These are, of course, merely examples and are not intended to be limiting.

According to certain embodiments, methods of prevention of loss of fluid stored in a reservoir existing in a subterranean formation include application of combinations of several materials providing assembly of particles on the formation's surfaces driven by electrostatic interactions that in some of the embodiments are followed or accompanied by treatments resulting in the creation of additional bonds within and/or between said particles to obtain a fluid-impermeable barrier on the surface of the formation and seal any natural or artificial fractures and other voids therein.

Application of embodiments of the treatments disclosed herein provide a uniform, single-layer coverage of the treated surface with particles that are synergistic with mechanical bridging of fractures and other voids of the subterranean formation by conventional bridging materials or particles of water-swellable polymers known in the art.

In certain embodiments, treatments containing positively charged compounds and/or particles are alternated with treatments containing negatively charged compounds and/or particles to afford layered coatings with controlled composition and thickness of every layer. The coatings provided by the layer-by-layer assembly of compounds and particles may undergo spontaneous dewatering, particle coalescence and chemical transformations leading to the formation of continuous composite films, whose elasticity and strong adhesion to the subterranean formation prevents them from being dislodged while subjected to stress cycling during repeated filling and discharging of the stored fluid. In certain embodiments, some or all the layers of the layer-by-layer assembled coating are composed of viscous, water-insoluble liquids that provide self-healing properties to the coating.

According to certain embodiments, the reservoir created in a subterranean shale formation by hydraulic fracturing is treated by a single pill of a cationic asphalt emulsion containing 0.1-50% asphalt, with balance being water and cationic surfactants. The positively charged emulsion droplets adhere to the surface of the shale charged negatively, which may be owed to the presence of clays and calcium/magnesium carbonates. At the same time, the rock surface adsorbs the cationic surfactants that stabilize the emulsion causing its droplets to collapse. Some of the droplets collapse after being adsorbed to the rock surface and form a continuous waterproof coating, while the others collapse in the bulk phase forming larger aggregates of semi-solid asphalt that act as a bridging material for fractures and voids.

According to certain embodiments, the reservoir created in a subterranean shale formation by hydraulic fracturing is treated by a pill of an emulsion prepared from polysulfide oligomers, exemplified by Thiokol® (which is a registered trademark of Thiokol Chemical Corporation) products, with molecular weights from 200 to 30000 Da, water, cationic surfactant(s), exemplified by hexadecyltrimethylammonium chloride and curing agent(s), exemplified by calcium peroxide, so that the oligomer content is 0.001 to 20%, surfactant content is 0.001 to 1% and curing agent content is 0.001 to 10%. The liquid film formed by the adsorption and coalescence of polysulfide oligomer particles on the shale surface undergoes crosslinking by the curing agent to form a layer of water-impermeable rubber-like material.

According to certain embodiments, the initial treatment of a reservoir created in a subterranean shale formation by hydraulic fracturing consists of a pill of a solution of poly(diallyldimethylammonium chloride) (polyDADMAC) in water containing 0.001-10% by weight of the polyDADMAC. The subsequent treatment is provided as a pill of a curable anionic latex, exemplified by an aqueous emulsion of poly(2-chlorobuta-1,3-diene) stabilized by sodium rosinate and alkyl sulfonates, containing zinc oxide and mercaptobenzothiazole as curing agents. The latex pill contains 0.001 to 30% by weight of poly(2-chlorobuta-1,3-diene), 0.001 to 5% of sodium rosinate and alkyl sulfonates, 0.001 to 10% of zinc oxide and 0.001 to 10% of mercaptobenzothiazole. The liquid film formed by the adsorption and coalescence of the latex particles on the shale surface undergoes crosslinking by the curing agent to form a layer of water-impermeable chloroprene rubber.

According to certain embodiments, the curing agents are supplied as a separate pill after a liquid film of a curable polymer/oligomer has been formed on the reservoir's surface.

According to certain embodiments, the initial treatment of a reservoir created in a subterranean shale formation by hydraulic fracturing includes a pill of a solution of poly(diallyldimethylammonium chloride) (polyDADMAC) in water containing 0.001-10% by weight of the polyDADMAC. This treatment creates a strongly bound, single molecule thick layer of the positively charged polyDADMAC on the shale surface. The immediately following treatment includes a pill of a dispersion of particles (0.001 to 10 mm diameter in dry state) of crosslinked, partially hydrolyzed polyacrylamide (PHPA), commonly used as a soil conditioner and available from multiple vendors, in water. The content of the dry polymer in the particle dispersion is 0.001 to 1% as the particles absorb up to 300 times their weight of water depending on the content and composition of electrolytes contained therein. The water-swollen PHPA particles form a one particle thick coating on the surface of the polyDADMAC treated shale, which may be owed to significant negative charges on their surfaces. The final treatment consists of a pill of a cationic asphalt emulsion containing 0.1-50% asphalt (bitumen), with balance being water and cationic surfactants. The positively charged asphalt droplets attract to the negatively charged exposed surfaces of PHPA particles forming a coating. The resulting layered coating undergoes dewatering of the PHPA layer and coalescence of the droplets of the asphalt emulsion as it ages to afford an elastic and water-tight layer covering the entire surface of the reservoir. During the application of the PHPA particle pill, mechanical bridging of larger fractures and voids existing in the reservoir by electrostatically unbound gel particles also occurs. The elasticity of the PHPA gel particles allows them to conform to the rock surface and to each other thus creating low-porosity beds, whose surface becomes coated with a water impermeable layer by the following treatment with asphalt emulsion.

To further illustrate various illustrative embodiments of the present invention, the following examples are provided.

Example 1

In a demonstration of an embodiment of the present method, a fragment of Eagle Ford shale was dipped in a 1% aqueous solution of polyDADMAC in water for 30 seconds and then briefly rinsed with water to remove any unbound polymer. Then the fragment was dipped in a slurry of crosslinked PHPA particles (0.063-0.125 mm dry size) in water containing 0.5% of the PHPA by weight and rinsed with water by dipping to remove the particles that are not directly bound to the rock surface. A uniform layer of hydrogel particles coating the shale fragment was observed after rinsing. Finally, the fragment was dipped into a cationic asphalt emulsion (CRS-2, AEI, Inc.) and a continuous film of asphalt formed on its surface immediately. When the treated shale fragment was allowed to dry at room temperature, the hydrated PHPA particles collapsed and a shiny asphalt coating tightly adhering to the rock surface resulted.

In a control experiment, a similar fragment of shale was dipped in water, then in the slurry of the crosslinked PHPA particles and finally rinsed with water by dipping. No gel particles remained on the fragment's surface after rinsing.

Example 2

A 13-mm diameter polypropylene column was packed to the height of 50 mm by fragments of ground Eagle Ford shale (2-4 mm fraction) and rinsed with water (50 ml). The water flowed through the column at the rate of several milliliters per second and then it was allowed to drain completely. Following the drainage, a cationic asphalt emulsion (CRS-2, AEI, Inc.) was added to the top of the column (3 ml). The flow stopped after 2 ml of water was collected and it didn't resume when additional asphalt emulsion was poured into the column (5 ml). A consolidated asphalt layer was visible in the top part of the column.

Example 3

A 13-mm diameter polypropylene column was packed to the height of 50 mm by particles of PHPA (0.063-0.125 mm dry size) hydrated in water for 24 hours. Then, water (5 ml) was added to the top of the particle layer and allowed to drain under natural gravity until the flow stopped entirely. The rate of draining was about 2 ml/min. Following the draining, a cationic asphalt emulsion (CRS-2, AEI, Inc., 5 ml) was added to the top of the particle layer. The flow of water stopped completely after 2 ml of water was collected and it didn't resume when more asphalt emulsion was added. A tight layer of asphalt was clearly visible in the topmost part.

Although the present invention and its advantages have been described in detail, it should be understood that various changes, substitutions and alterations may be made herein without departing from the spirit and scope of the invention as defined by the appended claims.

What is claimed is:

1. A method for mitigation of fluid loss from a reservoirs existing in a subterranean shale formation comprising:
   providing the reservoir in the subterranean shale formation, wherein the surface of the reservoir was created by hydraulic fracturing;
   conducting an initial treatment of the reservoir, wherein the initial treatment consists of an initial pill of a solution of poly(diallyldimethylammonium chloride) (polyDADMAC) in water containing 0.001-10% by weight of the polyDADMAC;
   conducting a second treatment of the reservoir, wherein the second treatment comprises a second pill of a curable anionic latex, wherein the curable anionic latex comprises an aqueous emulsion of poly(2-chlorobuta-1,3-diene) stabilized by sodium rosinate and alkyl sulfates, containing zinc oxide and mercaptobenzothiazole as curing agents, and further wherein the second pill contains 0.001-30% by weight of poly(2-chlorobuta-1,3 diene), 0.001-5% of sodium rosinate and alkyl sulfates, 0.001-10% of zinc oxide, and 0.001-10% of mercaptobenzothiazole; and
   allowing a liquid film to form on the surface of the reservoir by the adsorption and coalescence of particles of the curable anionic latex, wherein the liquid film crosslinks with the curing agents to form a layer of water-impermeable chloroprene rubber.

2. The method of claim 1, wherein the curing agents are supplied as a separate, third pill after the step of allowing the liquid film to form on the surface of the reservoir.

\* \* \* \* \*

UNITED STATES PATENT AND TRADEMARK OFFICE
CERTIFICATE OF CORRECTION

PATENT NO. : 12,173,227 B2
APPLICATION NO. : 17/677734
DATED : December 24, 2024
INVENTOR(S) : Dmitry Kosynkin and Howard K. Schmidt It is certified that error appears in the above-identified patent and that said Letters Patent is hereby corrected as shown below:

In the Claims

Column 6, Claim 1, Line 2 says "from a reservoirs", but it should be -from a reservoir-.

Signed and Sealed this
Fifteenth Day of April, 2025

Coke Morgan Stewart
*Acting Director of the United States Patent and Trademark Office*